United States Patent
Ratliff, Jr.

[11] Patent Number: 5,807,446
[45] Date of Patent: Sep. 15, 1998

[54] TIRE SIDEWALL MOSAIC DESIGN PATTERNS

[75] Inventor: Bill Joe Ratliff, Jr., Akron, Ohio

[73] Assignee: The Goodyear Tire & Rubber Company, Akron, Ohio

[21] Appl. No.: 954,802

[22] Filed: Oct. 21, 1997

Related U.S. Application Data

[63] Continuation of Ser. No. 614,948, Mar. 11, 1996, abandoned.

[51] Int. Cl.⁶ .................................................. B60C 13/02
[52] U.S. Cl. ........................................... 152/523; 152/524
[58] Field of Search ..................... 152/523, 524, 152/DIG. 12; D12/152

[56] References Cited

U.S. PATENT DOCUMENTS

| D. 96,797 | 9/1935 | Anderson | D12/152 |
| D. 99,981 | 6/1936 | Anderson | D12/152 |
| D. 114,432 | 4/1939 | Anderson | D12/152 |
| 4,823,856 | 4/1989 | Roberts | 152/523 |
| 5,303,758 | 4/1994 | Clementz et al. | 152/523 |

FOREIGN PATENT DOCUMENTS

| 0691224 | 3/1995 | European Pat. Off. | |
| 4111345 | 11/1991 | Germany | 152/523 |
| 63-74703 | 4/1988 | Japan | 152/523 |
| 64-16407 | 1/1989 | Japan | 152/523 |
| 443862 | 3/1936 | United Kingdom . | |
| 1188287 | 7/1966 | United Kingdom . | |

Primary Examiner—Geoffrey L. Knable
Attorney, Agent, or Firm—David L. King

[57] ABSTRACT

A sidewall 4 for a tire, the sidewall 4 has an annular exterior surface having a first background pattern 20,30,40 formed by numerous ridges 22,32,42 interrupted by a plurality of contrasting surface patterns 21,31,41. The contrasting surface patterns 21,31,41 are preferably smooth but can be textured or grainy in appearance, it being most preferred that these surface patterns 21,31,41 be similar in texture but not in shape. The combination of the numerous linear extending ridges 22,32,42 and the plurality of surface patterns 21,31,41 create an irregular mosaic background pattern 20,30,40.

7 Claims, 6 Drawing Sheets

સ5,807,446

TIRE SIDEWALL MOSAIC DESIGN PATTERNS

This is a continuation of application Ser. No. 08/614,948 (parent), filed on Mar. 11, 1996 (parent), now abandoned.

BACKGROUND OF THE INVENTION

This invention relates to design patterns for tire sidewalls. More specifically to a unique design pattern employed as a background pattern for a tire sidewall.

Manufacturers of tires have placed numerals, letters, characters or other designations upon the sidewalls of tires to enhance appearance and marketability of their products. Such markings are commonly called indicia. Often the tire sidewall is only black in color, sometimes a white annular band is employed called a whitewall. Alternatively, the indicia may have a white color or outline appearance. The use of contrasting color maximized readability of the lettering.

In U.S. Pat. No. 5,303,758 a tire sidewall employed parallel ridges which greatly enhanced appearance of the black lettering comprised of ridges superimposed over a black background of parallel radially extending ridges oriented about normal to the ridges of the lettering. Each pattern exhibited a contrasting light reflection relationship.

The present invention similarly employs a black background pattern for a tire sidewall. The pattern yields an unusual "mosaic pattern" of ridges and smooth portions. The term "mosaic" in the fine arts meant a surface decoration made by inlaying in patterns small pieces of colored glass stone or other materials. As used herein this application the term mosaic means a combination of adjacent irregular shaped surfaces molded onto the tire surface thus creating the appearance of a mosaic picture or design.

SUMMARY OF THE INVENTION

A sidewall 4 for a tire 2, the sidewall 4 has an annular exterior surface having a first background pattern 20,30,40 formed by numerous ridges 22,32,42 interrupted by a plurality of contrasting surface patterns 21,31,32. The contrasting surface patterns 21,31,32 are preferably smooth but can be textured or grainy in appearance, it being most preferred that these surface patterns 21,32,32 be similar in texture but not in shape. The combination of the numerous linear extending ridges and the plurality of surface patterns 21,31, 32 create an irregular mosaic pattern.

This first background pattern 20,30,40 preferably extends circumferentially around the entire sidewall 4.

The preferred sidewall 4 exhibits a second background pattern 12 having a smooth surface for displaying lettering numerals, symbols and other related indicia 14.

DEFINITIONS

"Axial" and "axially" means the lines or directions that are parallel to the axis of rotation of the tire.

"Circumferential" means lines or directions extending along the perimeter of the surface of the annular tire perpendicular to the axial direction.

"Light deflection" means that as light strikes a surface, the reflected light is angularly directed relative to the angle of incidence of the light source yielding what appears to be a light absorbing characteristic to an observer who is positioned in general alignment with the light source.

"Light reflection" means that as light strikes an object, the reflected light is generally aligned with the angle of incidence yielding what appears to be a shiny or reflective characteristic to an observer who is positioned in general alignment with the light source.

"Radial" and "radially" mean directions radially toward or away from the axis of rotation of the tire.

"Sidewall" means that portion of a tire between the tread and the bead.

"Tread" means that portion of the tire that comes into contact with the road under normal inflation and load.

DETAILED DESCRIPTION OF THE INVENTION

Figure 1:
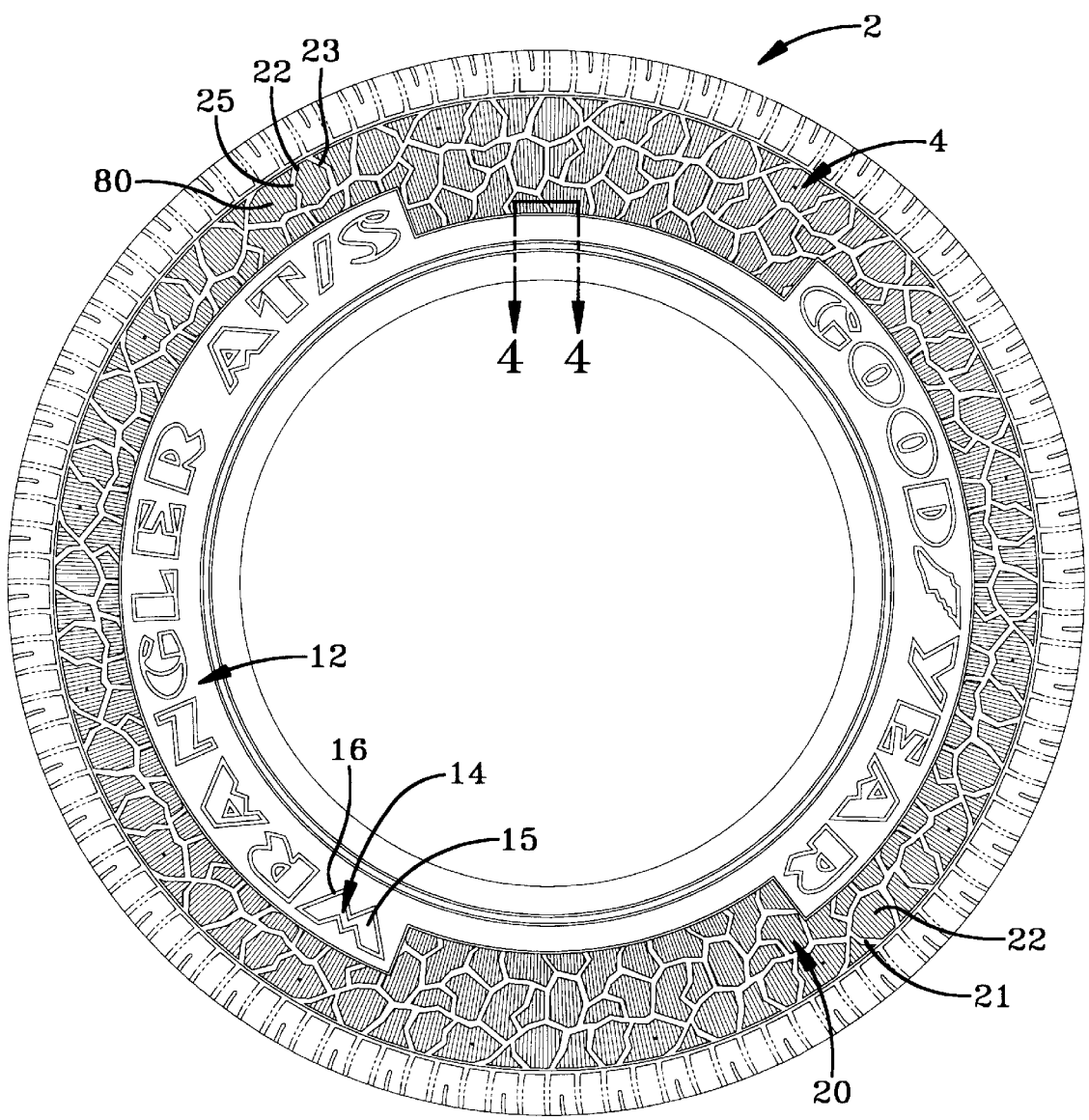
FIG. 1 is a plan view of a tire sidewall according to a first embodiment of the invention.

With reference to FIG. 1, a plan view of a tire sidewall 4 of a first embodiment tire 2 according to the invention is illustrated.

The first background pattern 20 is formed by numerous linear extending ridges 22 interrupted by a plurality of contrasting surface patterns 21. The combination of the numerous linear extending ridges 22 and a plurality of contrasting surface patterns 21 creates an irregular mosaic background pattern 20. This first background pattern 20 extends circumferentially around the entire sidewall 4. The interrupted ridges 22 are grouped together and defined in shape by the contrasting surface pattern 21, the contrasting surface pattern 21 is preferably smooth in appearance. The collective groups of interrupted ridges 22 preferably have irregular perimeter 23 shapes. The combination when employed in FIGS. 1 and 2 give the overall appearance of broken rocks.

Figure 2:
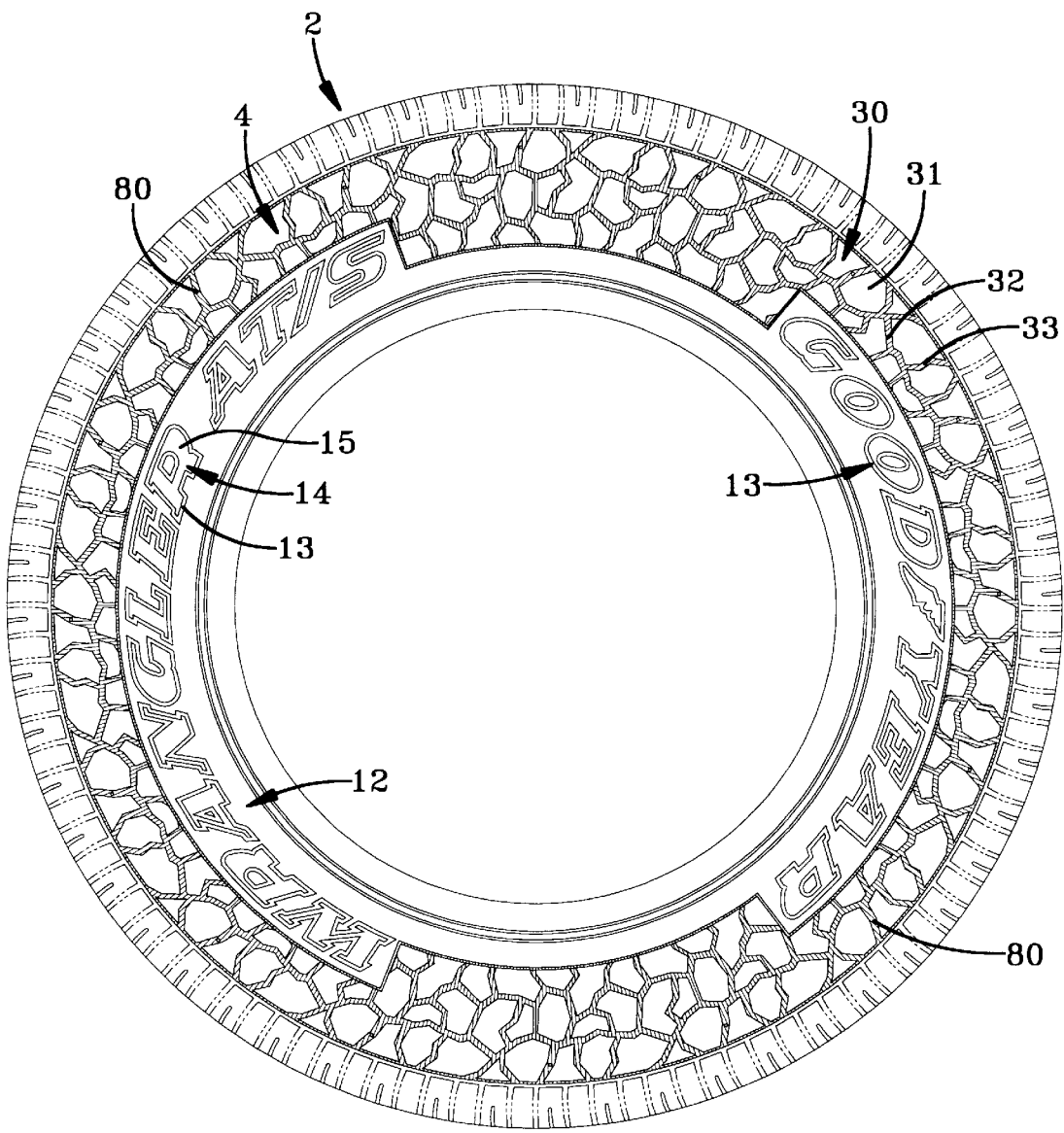
FIG. 2 is a plan view of a tire sidewall according to a second embodiment of the invention.

In FIG. 2 a plan view of the tire sidewall 4 of a second embodiment tire 2 of the invention is shown. In FIG. 2 the background pattern 30 is the reverse of the background pattern 20 of FIG. 1. In FIG. 2, the smooth or contrasting surface patterns 31 are bounded and defined by the numerous linear extending interrupted ridges 32. The ridges 32 forming a maze of interconnected paths. The combination of the two patterns 31,32 again create an irregular mosaic pattern 30 similar to broken rock. In each of FIGS. 1 and 2 either the groups of interrupted ridges 22,32 are spaced from adjacent groups of interrupted ridges 22,32 by either narrow interconnected paths 25 or irregular perimeter shapes 33 formed by the plurality smooth surface patterns 31 as shown.

In both FIGS. 1 and 2 at least one second background pattern 12 is shown. This second background pattern 12 has a surface used for displaying lettering, numerals, symbols and other related indicia 14. Preferably, this second background pattern 12 has a smooth exterior surface from which the indicia 14 extends. The indicia 14 can be a plurality of numerals, letters, or symbols and may be formed with a black or even a white exterior surface 15,16. When making a white lettered tire 2, white surfaced indicia 16 is positioned on a portion of the second background pattern 12. The indicia 14 of the second background pattern 12 as shown in the figures is circumferentially aligned with a portion of the first background pattern 20,30 or 40.

Figure 3:
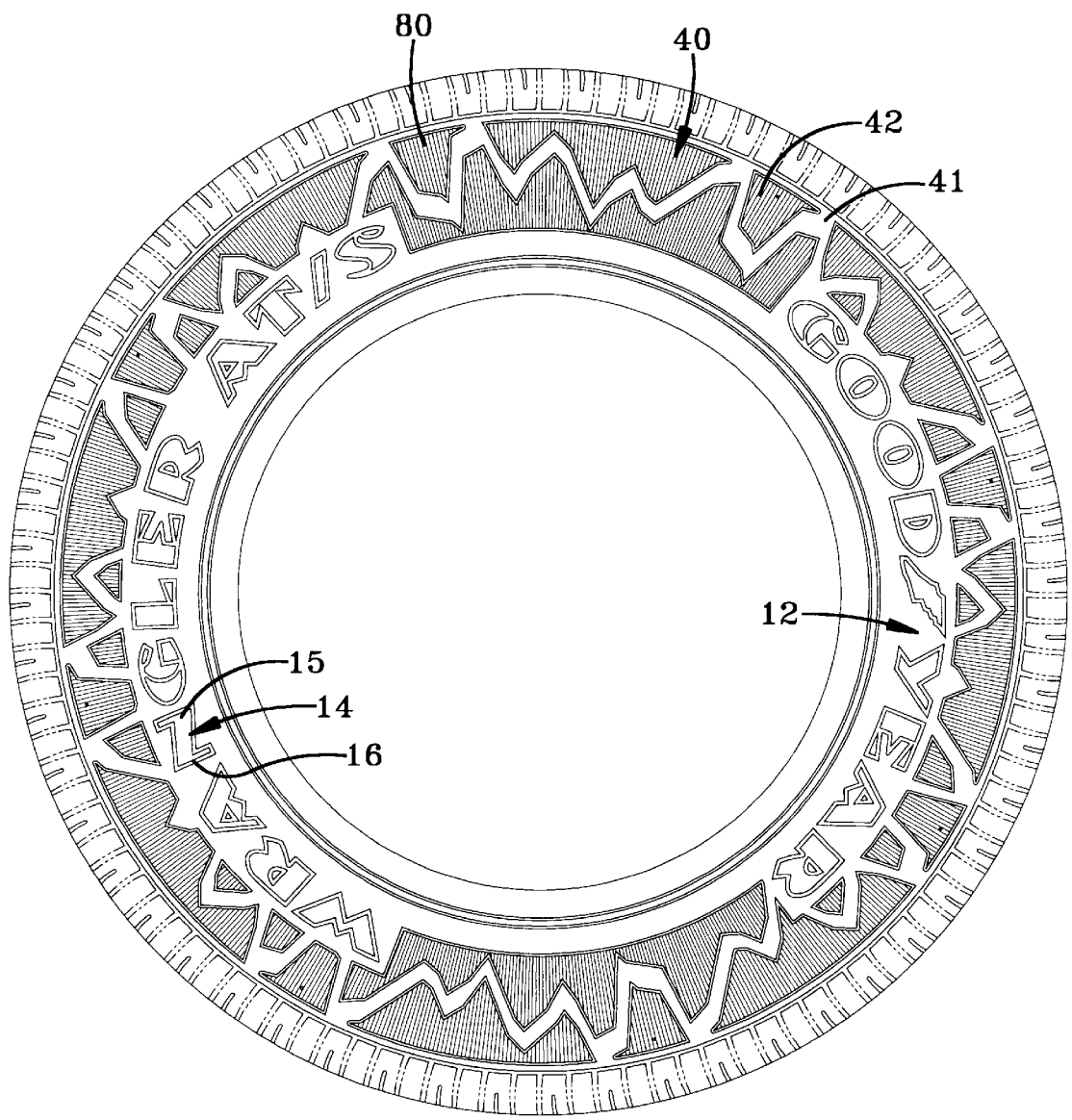
FIG. 3 is a plan view of a tire sidewall according to a third embodiment of the invention.

FIG. 3 shows an inventive application of the use of the interrupted ridges 42. This background pattern 40 creates a mosaic appearance of "jagged mountains."

Figure 4:
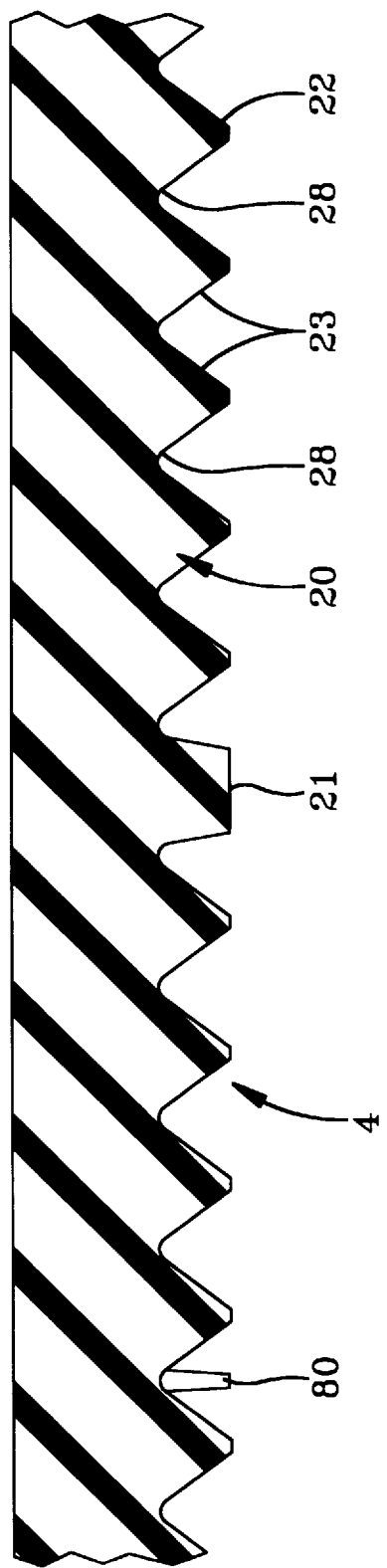
FIG. 4 is a cross sectional view of a portion of the sidewall of the tire of FIG. 1.

FIG. 4 is a cross sectional view of the ridges 22. It is believed preferable that the ridges be substantially triangular in cross section with the surfaces 27 inclined at 45° angles. The surfaces 27 at the base of each triangular cross shape are radiused 28 at about 0.002 of an inch. The radiused base insures that the ridge 22 does not exhibit cracks. This is particularly significant because the ridges 22 in some portions of the sidewall is superimposed or overlays the white elastomer 16 which is below an outer black covering layer of elastomer 15. This covering layer 15 is partially removed, usually by grinding to expose the indicia 14 thus forming white lettering or indicia. By radiusing the bases of the triangular shaped ridges 22 crack propagation is avoided.

Figure 5:
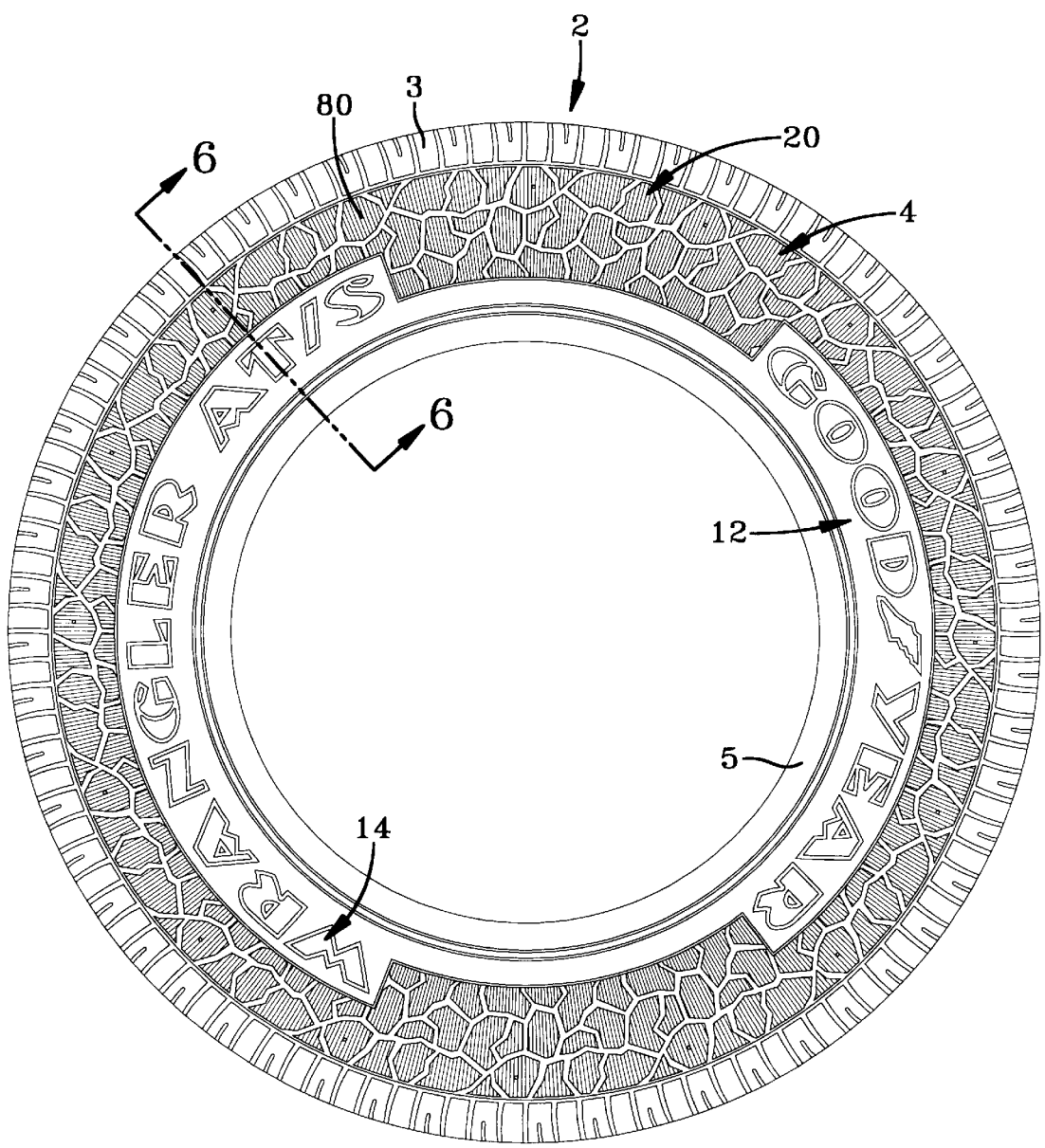
FIG. 5 is a plan view of the sidewall of FIG. 1 with an exemplary tread showing one of the ways in which invention can be used in a tire.

As further shown in FIG. 5, the invention as discussed in FIG. 1 is shown employed on the tire 2 having a radially outer tread 3, a pair of radially inner bead portions 5 and a pair of sidewalls 4, one sidewall 4 disposed between the tread 3 and each of the bead portions 5. At least one of the sidewalls 4 have an exterior surface having a first background pattern 20 in the form of a mosaic exhibiting a plurality of irregular shaped surfaces 21,22 and a second background pattern 12 for displaying indicia 14.

Figure 6:
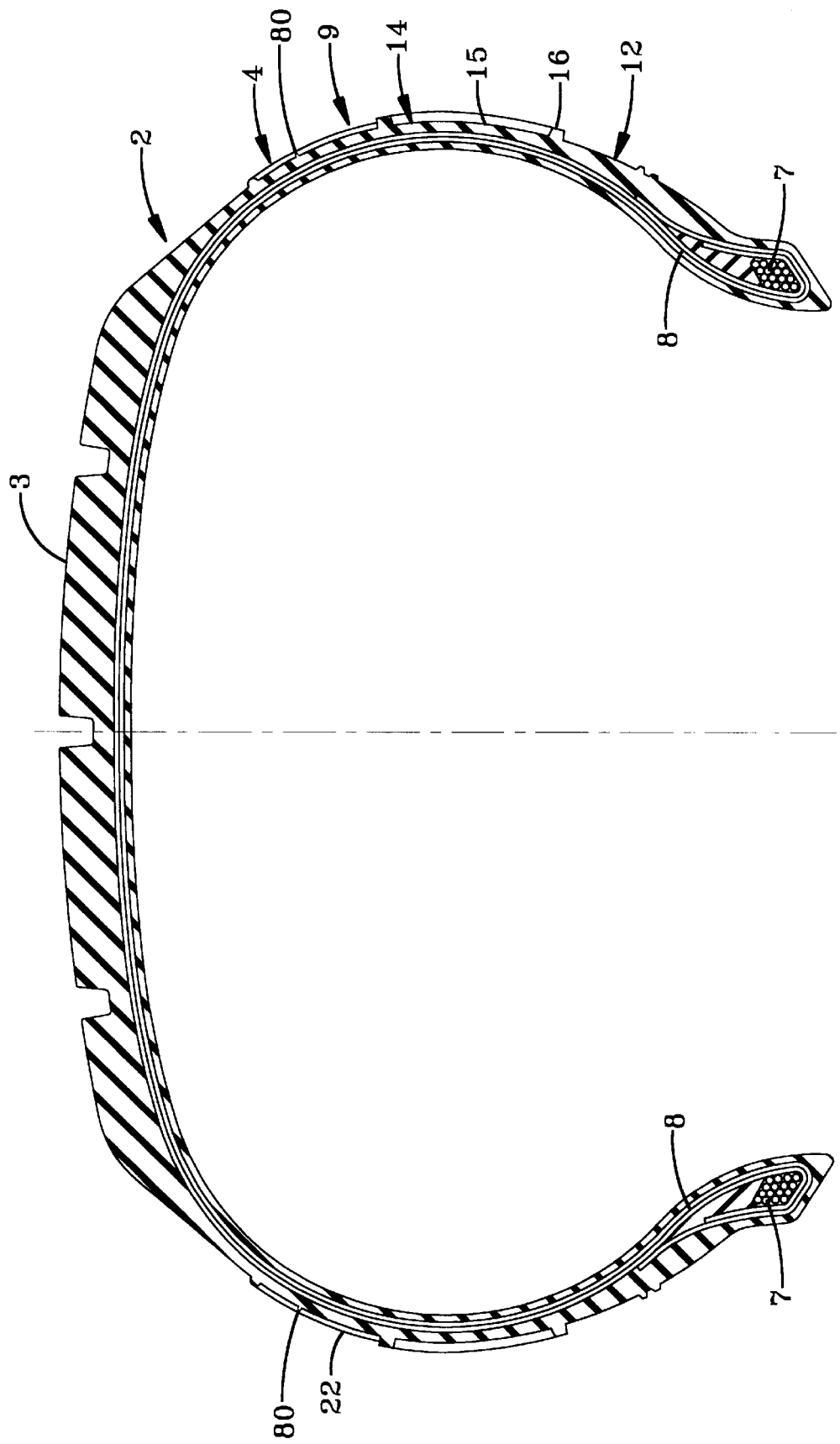
FIG. 6 is a cross sectional view of the tire taken from FIG. 5.

As further shown in FIG. 6, the tire 2 has a tread 3 and a pair of radially inwardly extending sidewalls 4 extending inwardly to the bead portions 5. Each bead portion 5 includes one annular inextensible bead core 7. One or more cord reinforced elastomeric ply 8 is wrapped about each bead core 7 and in combination with the sidewalls and bead portions form the tire casing 9.

The inventive tire sidewall 4 provides a unique and visually striking appearance. Equalling important this novel design masks or camouflages manufacturing blemishes and scuffs. Hides the appearance of sidewall undulations and permits the tire designer to strategically position or locate tire vents 80 within the ridges 22,32,42 such that these protuberances are almost imperceptible.

What is claimed is:

1. A tire, the tire having an axis of rotation and a sidewall having an annular exterior surface, the tire comprising:
   a first background pattern formed by numerous substantially parallel radially extending linear ridges interrupted by a plurality of smooth surface patterns, the combination of the numerous linear extending ridges and a plurality of smooth surface patterns, creating an irregular mosaic pattern on the annular exterior surface of the sidewall, each linear ridge being substantially triangular in cross section and having a radiused base, the linear ridges in some portions of the sidewall overlaying a white elastomer layer which is below an outer black covering layer.

2. The tire of claim 1 wherein the first background pattern extends circumferentially around the entire sidewall.

3. The tire of claim 1 wherein the sidewall further comprises at least one second background pattern, the second background pattern having a surface for displaying lettering, numerals, symbols and other related indicia.

4. The tire of claim 3 wherein the at least one second background pattern surface for displaying lettering, numerals, symbols and other related indicia is smooth.

5. The tire claim 1 wherein the first background pattern has groups of interrupted ridges spaced from adjacent groups of interrupted ridges by narrow interconnected paths of the plurality smooth surface patterns.

6. The tire claim 1 wherein the first background pattern has the plurality of smooth surface patterns spaced from adjacent smooth surface patterns by narrow interconnected paths formed by the interrupted ridges.

7. The tire of claim 3 wherein the second pattern has indicia having a plurality of numerals, letters or symbols formed with a white exterior surface, this white surfaced indicia being positioned on a portion of the second background pattern, the indicia of the second background pattern being circumferentially aligned with a portion of the first background pattern as measured from the axis of rotation.

* * * * *